United States Patent [19]

Musso, Jr.

[11] 4,266,731

[45] May 12, 1981

[54] DUMP SPREADER

[75] Inventor: Charles S. Musso, Jr., Bath, N.Y.

[73] Assignee: Air-Flo Manufacturing Co., Inc., Prattsburg, N.Y.

[21] Appl. No.: 83,688

[22] Filed: Oct. 11, 1979

Related U.S. Application Data

[63] Continuation-in-part of Ser. No. 36,771, May 7, 1979, abandoned, which is a continuation-in-part of Ser. No. 966,202, Dec. 4, 1978, abandoned.

[51] Int. Cl.³ .................... A01C 19/00; E01C 19/20
[52] U.S. Cl. .................................. 239/676; 239/677; 414/519
[58] Field of Search ............... 239/663, 672, 676, 677; 414/519, 520, 489, 503; 222/504, 561, 63; 296/50–52, 106

[56] References Cited

U.S. PATENT DOCUMENTS

| 1,219,737 | 3/1917 | Heilig | 222/561 |
|---|---|---|---|
| 2,791,973 | 5/1957 | Dorey | 222/561 |
| 3,122,251 | 2/1964 | Gardipee | 414/489 |
| 3,191,944 | 6/1965 | Watts | 222/504 |
| 3,206,215 | 9/1965 | DeJong | 239/676 |
| 3,344,993 | 10/1967 | Wilder et al. | 239/663 |
| 3,429,418 | 2/1969 | Fyrk | 239/663 |
| 3,780,955 | 12/1973 | Palmer | 239/672 |
| 3,790,090 | 2/1974 | Lorenc et al. | 239/676 |

*Primary Examiner*—Andres Kashnikow
*Attorney, Agent, or Firm*—Stonebraker, Shepard & Stephens

[57] ABSTRACT

A dump spreader achieves both slow speed spreading and high speed dumping of material from truck body 10 having a bottom conveyor 11 and hopper-shaped side walls. A fixed rear wall 12 secured to the side walls closes the rear end of the body above the conveyor, and the rear wall has a bottom opening 13 approximately the width of the conveyor and extending from the conveyor upward to one-half to three-quarters of the height of the rear wall. A vertically movable door 20 supported on the rear wall opens and closes the opening; and a hydraulic system raises and lowers the door to set the door at a desired low level above the conveyor for spreading, to raise the door fully so the conveyor can move a substantial depth of material rapidly through the opening for dumping, and to close the door through a depth of material on the conveyor after a partial dump. A spinner 15 operable in the spreader mode is detachable from the body via a pin and slot arrangement that also securely supports the spinner in place for spreading.

3 Claims, 9 Drawing Figures

U.S. Patent   May 12, 1981   Sheet 1 of 3   4,266,731
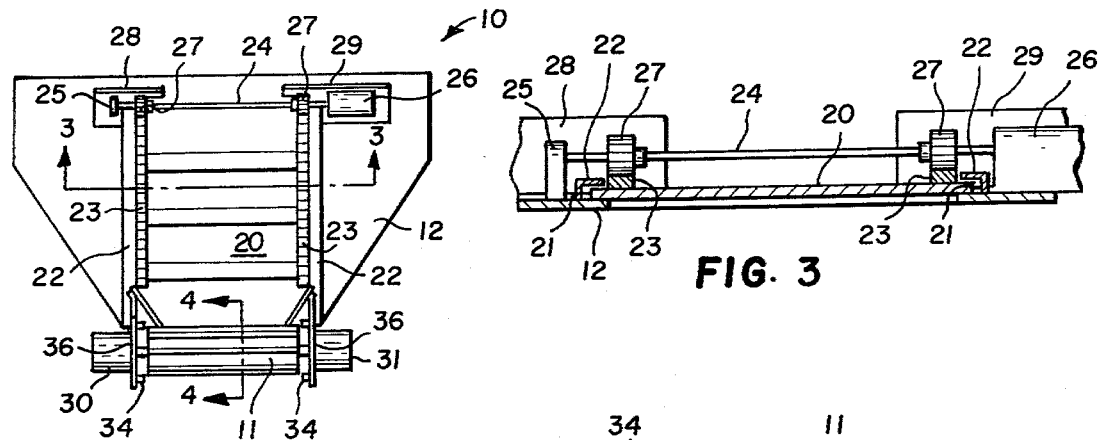
FIG. 1
FIG. 3
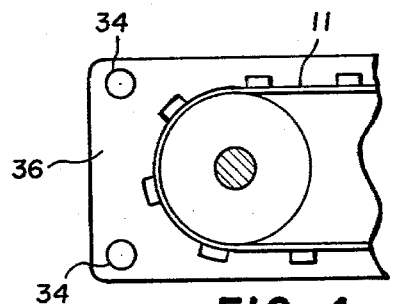
FIG. 4
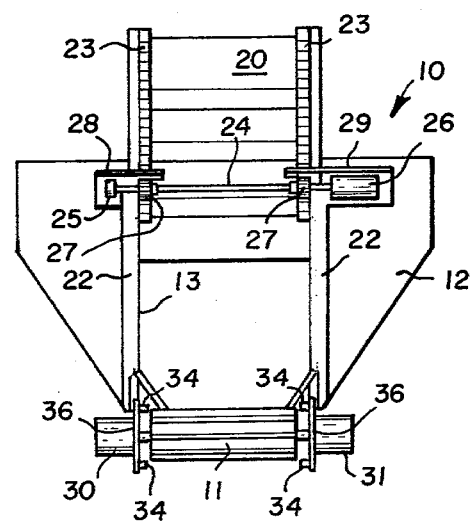
FIG. 2
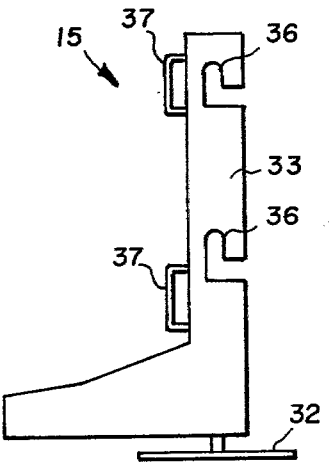
FIG. 5
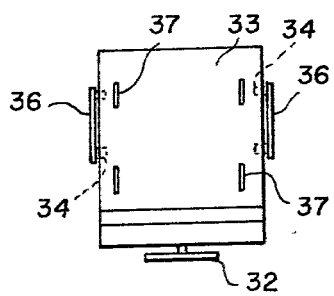
FIG. 6

DUMP SPREADER

RELATED APPLICATIONS

This application is a continuation-in-part of my parent application Ser. No. 036,771, filed May 7, 1979, entitled DUMP SPREADER, and abandoned upon the filing of this continuation-in-part application, and the parent application was a continuation-in-part of my grandparent application Ser. No. 966,202, filed Dec. 4, 1978, entitled DUMP SPREADER, and abandoned upon the filing of the parent case.

BACKGROUND OF THE INVENTION

Hopper-shaped truck bodies having bottom conveyors are used for slowly conveying material out through a metering opening to a spreader, usually in the form of a spinner device. U.S. Pat. No. 3,790,090 suggests a way of operating such a body to dump a whole load quickly by providing, in addition to a metering door, a pivoted rear dump gate such as used on tilting dump bodies. Then by moving the spinner mechanism aside and running the conveyor at high speed, it is possible to unload rapidly through the open rear gate.

The invention involves recognition of a better way of achieving spreading and both full and partial dumping from a hopper-shaped truck body having a bottom conveyor. The invention simplifies the necessary structure, eliminates manual operation, provides for full power control, and allows simple and convenient changing between spreading at slow rates and dumping at a maximum rate. It also suggests an improved and simplified way of making a spinner device quickly detachable from a truck body for dumping and easily reattachable to the body for spreading.

SUMMARY OF THE INVENTION

The inventive dump spreader applies to a truck body having hopper-shaped side walls that slope downward to a wide bottom conveyor that drives at different speeds and extends beyond a rear end of the truck body. A single rear door is used for both dumping and spreading material from the truck body, and a fixed rear wall connected between the side walls at the rear end of the truck body extends vertically to provide support for the rear door. The fixed rear wall has an opening that is approximately the width of the conveyor and extends vertically from the conveyor upward to about one-half to three-quarters of the height of the rear wall. The door is large enough to close the opening and is mounted for vertical movement on the rear wall over the opening. A hydraulic drive moves the door vertically and is powerful enough to overcome the resistance of material loaded in the truck body or lying on the conveyor under the door after partially dumping material from the truck body. The hydraulic drive can set the door at variable low heights above the conveyor for metering the flow of material from the truck body during spreading and can raise the door above the top of the fixed rear wall for fully opening the opening for dumping material quickly.

The hydraulic system is preferably a pair of double-acting hydraulic cylinders mounted in vertical orientation on the rear wall on opposite sides of the door with operating shafts of the cylinders connected to an upper region of the door for directly raising and lowering the door. A hydraulic valve controls the hydraulic cylinders, and an electric control is arranged in the cab for the truck body so an operator can operate the hydraulic valve and cylinders to open and close the door without leaving the cab.

DRAWINGS

FIGS. 1 and 2 are partially schematic rear end elevational views of a preferred embodiment of the inventive dump spreader showing a movable rear door respectively in closed and open positions.

FIG. 3 is a fragmentary cross-sectional view of the embodiment of FIG. 1 taken along the line 3—3 thereof;

FIG. 4 is a fragmentary cross-sectional view of the embodiment of FIG. 1 taken along the line 4—4 thereof;

FIG. 5 is a partially schematic side elevational view of a spinner mechanism for attachment to the inventive dump spreader;

FIG. 6 is a partially schematic fragmentary rear elevational view of the spinner device of FIG. 5 attached to the truck body illustrated in FIGS. 1-4;

DETAILED DESCRIPTION

Figure 7:
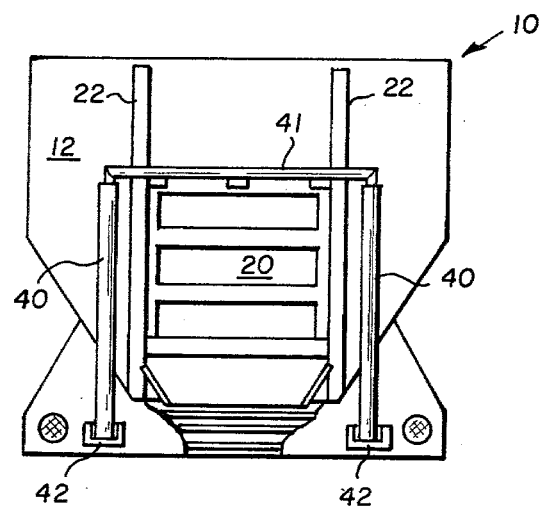
FIGS. 7 and 8 are partially schematic rear end elevational views of another preferred embodiment of the inventive dump spreader showing a movable rear door respectively in closed and open positions.

The inventive dump spreader applies to a truck body 10 having hopper-shaped side walls and a bottom conveyor 11 arranged as is generally known so that material carried in body 10 can be conveyed out the rear end of body 10 by conveyor 11. The invention involves a simple way of conveying the load material relatively slowly out the rear end of body 10 by conveyor 11 for spreading, and conveying material relatively rapidly out of body 10 for dumping or emptying body 10 quickly. The invention also allows closure of the rear end of body 10 after partially dumping a load. Conveyor 11 is preferably made relatively wide for more rapid dumping, and body 10 is made rugged and durable to withstand harsh use as a dump truck in addition to service as a spreader.

Instead of a pivotally mounted, latched and releasable dumping gate at the rear end of body 10 such as conventionally used for dumping a load from a truck body, the invention recognizes that dumping material by driving conveyor 11 rapidly can be accomplished by an enlarged rear door that also meters the spreading rate. A single large door can be supported on a fixed rear wall 12 and can be moved vertically by a powerful hydraulic system that is also simple and convenient. I have found that making the door and its opening as wide as the conveyor and tall enough to accommodate full conveyor flow is just as fast as dumping through a pivoted rear gate. The same door can also be set at variable low heights over the conveyor to meter the flow for spreading so that a single door accomplishes both functions.

A single rear door mounted on fixed rear wall 12 also makes the body 10 simple, rugged, and inexpensive. A single door with its hydraulic control is fast, convenient, safe, and powerful. It can be moved up or down against the pressure of a load and can be driven closed through material lying on the conveyor after partially dumping a load, which was not possible with a pivoted dump gate. Elimination of the dump gate also eliminates pivot supports, release or latch mechanisms, and manual operations.

Rear wall 12 has a relatively large bottom opening 13 that is centered over conveyor 11 and is approximately the width of conveyor 11 as illustrated. Opening 13 extends upward to one-half to three-quarters of the height of rear wall 12 so that opening 13 is tall enough for conveyor 11 to move a substantial depth of material rapidly through rear wall 12. Such a height and width gives opening 13 an area of about one-half the total area of rear wall 12. Opening 13 is limited to the space above conveyor 11 and leaves a substantial portion of rear wall 12 in tact as a rear end closure for body 10, and yet opening 13 provides an adequate passageway so that conveyor 11, in cooperation with the hopper-shaped side wall of body 10, can convey a load rapidly rearward through opening 13.

A single door 20 is mounted for vertical movement on rear wall 12 where it is supported over conveyor 11 for opening and closing opening 13. Door 20 can be set at relatively low vertical heights above conveyor 11 for metered delivery of material rearwardly from body 10 to a spreader and can be opened above the top of rear wall 12 for fully opening opening 13 for rapid dumping of material from body 10.

Door 20 has side edges 21 supported in channels 22 extending vertically along the sides of opening 13 on rear wall 12. Door 20 is thus guided for vertical sliding motion in channels 22 for opening and closing opening 13 in rear wall 12. Door 20 is tall enough and wide enough for fully closing opening 13, and it closes downward to a lowermost position closely spaced above conveyor 11 as shown in FIG. 1 and opens upward to an uppermost position where it extends substantially above the top of rear wall 12 and substantially opens the full height of opening 13 as shown in FIG. 2.

A hydraulic system is preferred for raising and lowering door 20 so that movement of door 20 is hydraulically powered both up and down. This allows door 20 to open or close against the resistance of a load in body 10 pressing against one side of door 20 or lying under the bottom of door 20 on conveyor 11. A hydraulic power source is especially effective in closing door 20 against a depth of material previously conveyed under door 20 after partially dumping a load, and hydraulic operation of door 20 eliminates manual struggles with movable doors or pivoting rear gates that can be very difficult to operate against the pressure of loaded material.

One preferred hydraulic system uses a rack and pinion drive as illustrated in FIGS. 1 and 2. A pair of racks 23 are arranged to extend vertically along opposite vertical edges 21 of door 20 inside of channels 22 to form parallel vertical racks for raising and lowering door 20. A rotatable shaft 24 is mounted on an upper region of rear wall 12 and oriented horizontally to extend across door 20. Shaft 24 is secured at one end in a bearing 25 and is turned at the other end by a hydraulic motor 26. A pair of pinions 27 mounted on shaft 24 are meshed with racks 23 for raising and lowering door 20 as shaft 24 rotates.

Deflectors or guards 28 and 29 are arranged over bearing support 25, drive motor 26, and pinions 27 to keep dirt off the hydraulic door operating device. Door 20 can be set at any desired level between the closed position of FIG. 1 and the wide open position of FIG. 2, and hydraulic power from motor 26 makes such adjustment convenient and effortless.

Conveyor 11 is also preferably hydraulically powered with hydraulic motors 30 and 31 that are arranged in generally known ways for running conveyor 11 at slow and high speeds. Especially since conveyor 11 is relatively wide, this allows dumping of the entire load from body 10 within a short interval of, for example, one minute by opening door 20 wide open and running conveyor 11 at maximum speed. The tall opening 13 allows conveyor 11 to convey the load rapidly out of body 10 without lifting or tilting body 10 or having to release or open any rear gate. For spreading, conveyor 11 is operated at slower speeds and door 20 is opened a lesser amount to meter the load for delivery aft by conveyor 11 under the bottom of door 20 in a spreading operation that distributes the load material slowly.

Figure 8:
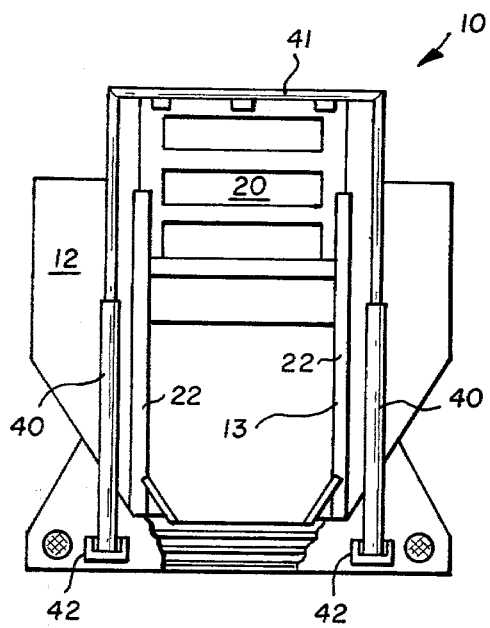

Another preferred hydraulic drive for door 20 as shown in FIGS. 7 and 8 uses a pair of double-acting hydraulic cylinders 40 on opposite sides of door 20. Cylinders 40 are mounted on rear wall 12 by brackets 42 near the bottom of door 20 and are vertically oriented and positioned closely against rear wall 12 to extend upward along opposite sides of door 20. A cross bar 41 welded to the top of door 20 extends outward at opposite side edges of door 20 to form a pair of lateral projections, and the extensible and retractable operating shafts of cylinders 40 are connected to cross bar 41 for directly raising and lowering door 20 by hydraulic power.

Double-acting hydraulic cylinders 40 have several advantages over a rack and pinion drive, including less susceptibility to damage or malfunction from dirt and greater lifting and lowering power for opening and closing door 20 against a load of material in body 10 or through a depth of material under door 20 on conveyor 11. The increase force that cylinders 40 can exert in driving door 20 downwardly allows spot dumping of portions of a load, because door 20 can be closed against a partially dumped load on conveyor 11 under door 20. This is not possible with a pivotal end gate. Cylinders with a long travel are preferred for raising door 20 above the top of rear wall 12 for clearing the full height of opening 13. As in a rack and pinion drive, guides 22 are preferred for guiding the side edges of door 20 up and down in its travel on rear wall 12.

Figure 9:
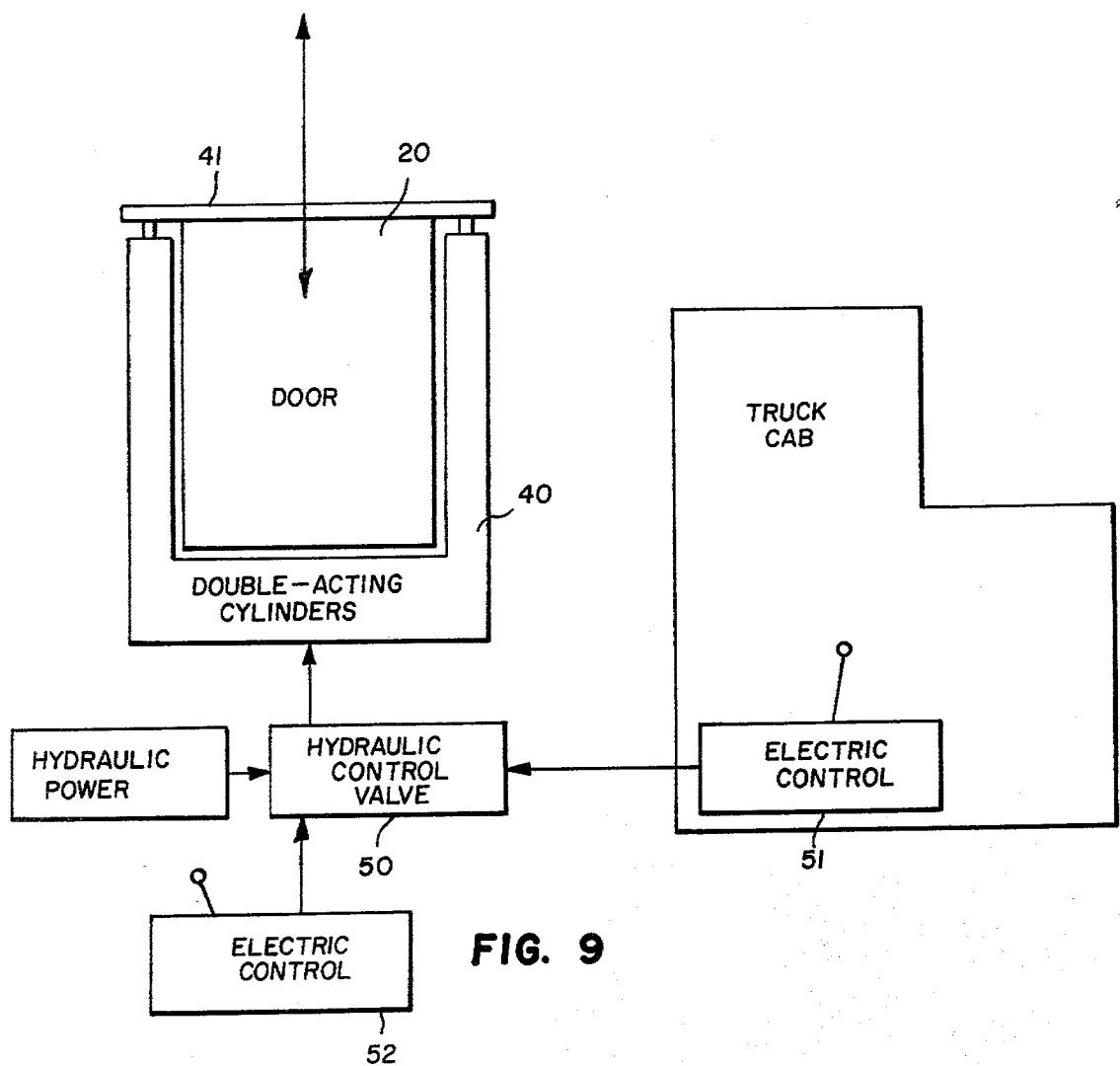
FIG. 9 is a schematic diagram of a preferred control system for the embodiment of FIGS. 7 and 8.

Another advantage of double-acting hydraulic cylinders 40 is facilitating the control of rear door 20 from the truck cab so that an operator does not have to dismount and move to the rear of the truck for properly positioning door 20. As schematically shown in FIG. 9, an electric control 51 arranged for operation in a truck cab controls a hydraulic valve 50 in a generally known way to apply hydraulic power to double-acting hydraulic cylinders 40 for raising and lowering and setting the open position of door 20. Another electric control 52 is arranged for controlling hydraulic valve 50 from the rear end of the truck body where it is conveniently used for setting the exact metering height desired for door 20. Versatile controls make the hydraulic operation not only powerful and effective, but fast and convenient.

A spinner device 15 is preferred for spreading material from body 10, and spinner 15 is a generally known device that uses a spinning disk 32 to spread material dropped off the rear end of conveyor 11. Spinner 15 is quickly and easily attached to body 10 aft of the rear end of conveyor 11 and is also easily detached from body 10 to get spinner device 15 out of the way for dumping a load from body 10.

Spinner 15 has a chute 33 that directs material downwardly from the rear end of conveyor 11 onto rotor disk 32 for spreading. Spinner 15 also includes a hydraulic motor and a hydraulic power line (not shown) and may include movable deflectors and guides that cooperate in generally known ways for setting the area over which material can be spread. Spinner 15 and body 10 share parts of a quick connect and disconnect mechanism that makes it especially easy to secure spinner 15 in place for spreading or remove it quickly for dumping. The quick connect and disconnect mechanism is a pin and slot arrangement having one component on body 10 and another component on spinner 15. The preferred arrangement as illustrated is four stub shafts or pins 34 arranged on body 10 just rearward of the rear end of conveyor 11 on opposite sides of conveyor 11 to receive spinner chute 33 which has corresponding slots 35 to slide onto and interlock with pins 34. Pins 34 are arranged on support plates 36 that are securely mounted on body 10, and slots 35 are generally L-shaped as illustrated and cut into the sheet metal side walls of chute 33 to interlock with pins 34. Handles 37 on spinner chute 33 are positioned for the convenience of workmen in grasping and lifting the spinner on and off support pins 34.

Those skilled in the art and familiar with dumping and spreading equipment will appreciate the many variations that are possible in adapting the invention to specific truck bodies or specific tasks. They will also understand the requirements of hydraulic drive and control systems and the operation of the invention under different circumstances.

I claim:

1. A dump spreader truck body having hopper-shaped side walls sloping downward to a wide bottom conveyor that can drive at different speeds and extends beyond a rear end of said body, said dump spreader comprising:

a. a single rear door for both dumping and spreading material from said body;
   b. a fixed rear wall connected between said side walls at said rear end of said body and extending vertically to provide support for said rear door;
   c. said fixed rear wall having an opening approximately the width of said conveyor and extending vertically from said conveyor upward to about one-half to three-quarters of the height of said rear wall;
   d. said door being large enough to close said opening and being mounted for vertical movement on said rear wall over said opening;
   e. a hydraulic drive powerful enough for moving said door vertically against the resistance of material loaded in said body or lying on said conveyor under said door after partially dumping material from said body; and
   f. said hydraulic drive being operable for setting said door at variable low heights above said conveyor for metering the flow of said material from said body during spreading and for raising said door above the top of said fixed rear wall for fully opening said opening for dumping material quickly.

2. The dump spreader of claim 1 wherein said opening is about one-half the total area of said fixed rear wall.

3. The dump spreader of claim 1 wherein said hydraulic drive comprises a pair of double-acting hydraulic cylinders mounted in vertical orientation on said rear wall on opposite sides of said door, extensible and retractable operating shafts of said cylinders each being connected to an upper region of said door for directly raising and lowering said door.

* * * * *

REEXAMINATION CERTIFICATE (178th)
United States Patent [19]
Musso, Jr.

[11] B1 4,266,731
[45] Certificate Issued  Mar. 20, 1984

[54] DUMP SPREADER

[75] Inventor: Charles S. Musso, Jr., Bath, N.Y.

[73] Assignee: Air-Flo Manufacturing Co., Inc., Prattsburg, N.Y.

Reexamination Request:
No. 90/000,356, Mar. 28, 1983

Reexamination Certificate for:
Patent No.: 4,266,731
Issued: May 12, 1981
Appl. No.: 83,688
Filed: Oct. 11, 1979

Related U.S. Application Data

[63] Continuation-in-part of Ser. No. 36,771, May 7, 1979, abandoned, which is a continuation-in-part of Ser. No. 966,202, Dec. 4, 1978, abandoned.

[51] Int. Cl.³ .................. A01C 19/00; E01C 19/20
[52] U.S. Cl. ......................... 239/676; 239/677; 414/519

[56] References Cited
U.S. PATENT DOCUMENTS 2,496,463  2/1950  Gaddis .
3,398,618  8/1968  Ulrich .
3,561,646  2/1971  Meharry .
3,677,540  7/1972  Weiss .
4,023,689  5/1977  Taylor et al. .

OTHER PUBLICATIONS

1970 Trade literature publication "HIGHLANDER" of Tarrant Manufacturing Company, Excelsion Avenue Extension, Saratoga Springs, New York 12866.

*Primary Examiner*—Andres Kashnikow

[57] ABSTRACT

A dump spreader achieves both slow speed spreading and high speed dumping of material from truck body 10 having a bottom conveyor 11 and hopper-shaped side walls. A fixed rear wall 12 secured to the side walls closes the rear end of the body above the conveyor, and the rear wall has a bottom opening 13 approximately the width of the conveyor and extending from the conveyor upward to one-half to three-quarters of the height of the rear wall. A vertically movable door 20 supported on the rear wall opens and closes the opening; and a hydraulic system raises and lowers the door to set the door at a desired low level above the conveyor for spreading, to raise the door fully so the conveyor can move a substantial depth of material rapidly through the opening for dumping, and to close the door through a depth of material on the conveyor after a partial dump. A spinner 15 operable in the spreader mode is detachable from the body via a pin and slot arrangement that also securely supports the spinner in place for spreading.

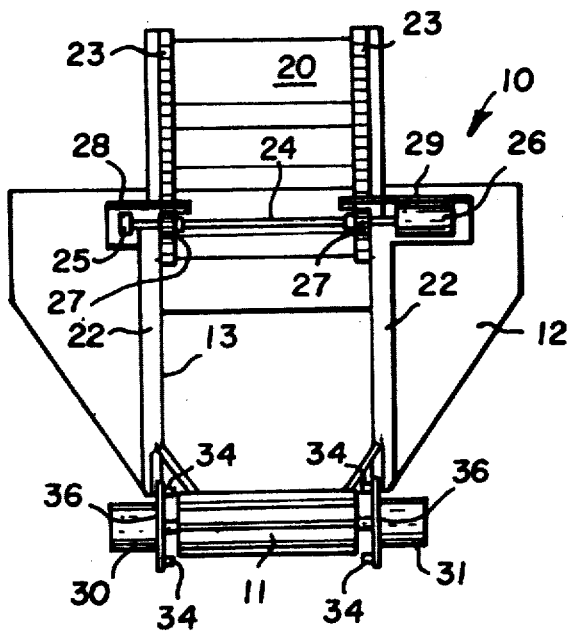

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

Claims 1-3, having been finally determined to be unpatentable, are cancelled.

* * * * *